United States Patent
Powell et al.

(10) Patent No.: US 12,318,733 B2
(45) Date of Patent: Jun. 3, 2025

(54) SYSTEMS AND METHODS OF MARKER BASED DIRECT INTEGRITY TESTING OF MEMBRANES

(71) Applicant: 1934612 ONTARIO INC., London (CA)

(72) Inventors: Anthony L. Powell, London (CA); Brian E. Butters, London (CA)

(73) Assignee: 1934612 Ontario Inc.

( * ) Notice: Subject to any disclaimer, the term of this patent is extended or adjusted under 35 U.S.C. 154(b) by 0 days.

(21) Appl. No.: 18/383,092

(22) Filed: Oct. 24, 2023

(65) Prior Publication Data

US 2024/0050904 A1     Feb. 15, 2024

Related U.S. Application Data

(60) Continuation of application No. 17/080,152, filed on Oct. 26, 2020, now Pat. No. 11,833,476, which is a
(Continued)

(51) Int. Cl.
*B01D 65/10* (2006.01)
*B01D 61/38* (2006.01)
(Continued)

(52) U.S. Cl.
CPC ........... *B01D 65/102* (2013.01); *B01D 61/38* (2013.01); *B01D 65/08* (2013.01);
(Continued)

(58) Field of Classification Search
None
See application file for complete search history.

(56) References Cited

U.S. PATENT DOCUMENTS

| 5,064,529 A | 11/1991 | Hirayama et al. |
| 5,227,342 A | 7/1993 | Anderson et al. |

(Continued)

FOREIGN PATENT DOCUMENTS

| CN | 105032196 A | 11/2015 |
| JP | 2000266660 A | 9/2000 |

(Continued)

OTHER PUBLICATIONS

International Search Report and Written Opinion of the International Searching Authority dated Jul. 10, 2018 in connection with International Application No. PCT/IB2018/000302, 10 pages.

(Continued)

*Primary Examiner* — Richard C Gurtowski
(74) *Attorney, Agent, or Firm* — Baker & McKenzie LLP (57) ABSTRACT

The present disclosure relates, according to some embodiments, to methods of marker based direct integrity testing of at least one membrane comprising: (a) dosing a feed fluid of a loop with at least one marker comprising at least one challenge particle, the loop comprising: the feed fluid; a pump comprising an outlet stream; a membrane module comprising the at least one membrane and a membrane module outlet stream, wherein the membrane module is in fluid communication with the outlet stream; a marker recycle stream in fluid communication with the membrane module outlet stream and the pump; and a means to measure particle concentrations; (b) circulating the feed fluid through the membrane module at least once to produce a filtrate comprising a filtered at least one marker; (c) measuring a filtrate particle concentration of the filtered at least one filtered marker in the filtrate to produce a filtrate concentration measurement; and (d) calculating a log removal value from the filtrate concentration measurement and the feed (Continued)

concentration measurement; wherein the log removal value is less than about 3 μm.

15 Claims, 3 Drawing Sheets

Related U.S. Application Data division of application No. 15/914,966, filed on Mar. 7, 2018, now Pat. No. 10,814,284.

(60) Provisional application No. 62/468,280, filed on Mar. 7, 2017.

(51) Int. Cl.
| | |
|---|---|
| *B01D 65/08* | (2006.01) |
| *B01D 71/02* | (2006.01) |
| *G01N 15/02* | (2006.01) |
| *G01N 15/06* | (2006.01) |
| *G01N 15/08* | (2006.01) |
| *G01N 15/00* | (2006.01) |
| *G01N 15/075* | (2024.01) |

(52) U.S. Cl.
CPC ....... *B01D 71/0215* (2022.08); *B01D 71/024* (2013.01); *G01N 15/02* (2013.01); *G01N 15/06* (2013.01); *G01N 15/082* (2013.01); *G01N 15/0826* (2013.01); *C02F 2209/105* (2013.01); *C02F 2209/11* (2013.01); *C02F 2209/36* (2013.01); *C02F 2209/40* (2013.01); *G01N 2015/0053* (2013.01); *G01N 2015/0687* (2013.01); *G01N 15/075* (2024.01); *G01N 2015/0813* (2013.01); *G01N 2015/084* (2013.01)

(56) References Cited

U.S. PATENT DOCUMENTS

| | | | |
|---|---|---|---|
| 5,358,690 | A | 10/1994 | Guirguis |
| 7,040,512 | B2 | 5/2006 | Tanny et al. |
| 10,814,284 | B2 * | 10/2020 | Powell .................. G01N 15/06 |
| 2003/0159977 | A1 | 8/2003 | Tanny et al. |
| 2009/0145831 | A1 | 6/2009 | Manabe et al. |
| 2011/0138936 | A1 | 6/2011 | Collins et al. |

FOREIGN PATENT DOCUMENTS

| | | |
|---|---|---|
| JP | 2012192365 A | 12/2012 |
| JP | 2013505824 A | 2/2013 |
| WO | 2007046095 | 4/2007 |

OTHER PUBLICATIONS

Preliminary Office Action dated Jul. 4, 2023 in connection with Brazilian Patent Application No. BR112019018563-1, 4 pages.
Office Action dated Nov. 12, 2024 in connection with Canadian Patent Application No. CA 3,055,135, 7 pages.

* cited by examiner

FIG. 3

SYSTEMS AND METHODS OF MARKER BASED DIRECT INTEGRITY TESTING OF MEMBRANES

CROSS-REFERENCE

This application is a Continuation Application of U.S. patent application Ser. No. 17/080,152 filed on Oct. 26, 2020, which is a Divisional Application of and claims priority to U.S. patent application Ser. No. 15/914,966 filed on Mar. 7, 2018, now U.S. Pat. No. 10,814,284 issued on Oct. 27, 2020, that is a nonprovisional application of, and thus claims priority to U.S. Provisional Application No. 62/468,280 filed on Mar. 7, 2017, each of which are incorporated by reference herein.

FIELD OF THE DISCLOSURE

The present disclosure relates, in some embodiments, to systems and methods for marker based direct integrity testing of membranes including, without limitation, a challenge test, a direct integrity test, and combinations thereof for membranes (e.g., ceramic membranes).

BACKGROUND OF THE DISCLOSURE

Interest in cleansed water, for example, as embodied in regulatory guidance such as the Long Term 2 Enhanced Surface Water Treatment Rules (LT2ESWT or LT2), may call for parasite (e.g., *Cryptosporidium, Giardia*) sanitization/removal from surface water and/or surface water impacted wells. LT2 requirements outline verification methods for ensuring membrane integrity for membranes that may be used for parasite removal. Membranes desirably may be free of breaches greater than 3 μm so that the membranes continue to filter cryptosporidium oocysts that typically have a diameter from about 4 μm to about 6 μm.

A challenge test in accordance with the LT2 guidance may be performed on five separate membranes of a membrane system to quantify the log removal value (LRV) of a parasite or a surrogate organism or marker of similar size, shape, and surface charge. These non-destructive challenge tests must be performed on membrane systems daily to insure there is no breach in membrane integrity that is greater than 3 μm.

Challenge testing typically requires a membrane system to be shut down, which lowers productivity (e.g., water filtered) and increases expenses (e.g., added maintenance), but a direct integrity test (DIT) such as a "bubble-decay" method may be used while a membrane system is running. However, while a bubble-decay method may work on some membranes with low porosity, this method does not work on ceramic membranes as the time it takes for the air pressure to drop is too rapid to attain a precision measurement necessary to measure a 3 μm or greater breach of the membrane.

SUMMARY

Accordingly, a need has arisen for improved methods of marker based direct integrity testing and of membranes. According to some embodiments, the present disclosure relates to a method of marker based direct integrity testing of at least one membrane comprising: (a) dosing a feed fluid of a loop with at least one marker comprising at least one challenge particle, the loop comprising: the feed fluid; a pump comprising an outlet stream; a membrane module comprising the at least one membrane and a membrane module outlet stream, wherein the membrane module is in fluid communication with the outlet stream; a marker recycle stream in fluid communication with the membrane module outlet stream and the pump; and a means to measure particle concentrations; (b) circulating the feed fluid through the membrane module at least once to produce a filtrate comprising a filtered at least one marker; (c) measuring a filtrate particle concentration of the filtered at least one filtered marker in the filtrate to produce a filtrate concentration measurement; and (d) determining from the filtrate concentration measurement if a breach is present in the at least one membrane.

In some embodiments, the present disclosure relates to a method of marker based direct integrity testing of at least one membrane comprising: (a) isolating a loop from at least one portion of a water purification system, the loop comprising: a feed fluid; a pump comprising an outlet stream; a membrane module comprising the at least one membrane and a membrane module outlet stream, wherein the membrane module is in fluid communication with the outlet stream; a marker recycle stream in fluid communication with the membrane module outlet stream and the pump; and a means to measure particle concentrations; (b) dosing the feed fluid with at least one marker comprising at least one challenge particle; (c) circulating the feed fluid through the membrane module at least once to produce a filtrate comprising a filtered at least one marker; (d) measuring a filtrate particle concentration of the filtered at least one filtered marker in the filtrate to produce a filtrate concentration measurement; and (e) determining from the filtrate concentration measurement if a breach is present in the at least one membrane.

According to some embodiments, at least one membrane may comprise at least one ceramic membrane. At least one ceramic membrane may be selected from the group consisting of $TiO_2$, $ZrO_2$, $SiO_2$, $MnO_2$, SiC, CuO, MgO, and $Al_2O_3$. Dosing a feed fluid of a loop with at least one marker comprising at least one challenge particle may comprise a concentration of the at least one marker of about 6.5 log particle count. About 35% of at least one challenge particle by mass contains particles having a particle size from about 2 μm to about 3 μm. At least one challenge particle is a $TiO_2$, wherein $TiO_2$ may be a P25 $TiO_2$. At least one membrane module may be configured to operate at a flux from about 100 liters/m²/h to about 2,000 liters/m²/h during a method of marker based direct integrity testing of a membrane. A method of marker based direct integrity testing of at least one membrane may comprise calculating a log removal value from the filtrate concentration measurement, wherein the log removal value is less than about 3.

According to some embodiments, a marker based direct integrity of at least one membrane testing system may comprise: (a) a feed fluid comprising at least one marker, the at least one marker comprising at least one challenge particle; (b) a loop comprising: a pump comprising an outlet stream; a membrane module comprising the at least one membrane and a membrane module outlet stream, wherein the membrane module is in fluid communication with the outlet stream; and a marker recycle stream in fluid communication with the membrane module outlet stream and the pump; and (c) a particle counter, wherein marker based direct integrity membrane testing system is configured to measure a log removal value.

In some embodiments, a marker based direct integrity membrane system may comprise a high solids contact reactor tank in fluid communication in fluid communication with the pump; an inlet configured to receive an influent fluid, wherein the inlet is in fluid communication with the high solids contact reactor tank; an influent turbidity measurement device; an exit stream in fluid communication with the membrane module; and a permeate turbidity measurement device in fluid communication with the exit stream. A system may comprise a positive displacement pump.

In some embodiments, a means for measuring a particle concentration may comprise a particle counter. A means for measure a particle may comprise a turbidity measurement device.

BRIEF DESCRIPTION OF THE DRAWINGS

Some embodiments of the disclosure may be understood by referring, in part, to the present disclosure and the accompanying drawings, wherein.

DETAILED DESCRIPTION

The present disclosure relates, in some embodiments, to systems and methods of marker based direct integrity testing of membranes. Membranes may be used in water purification processes and/or fluid filtration processes, wherein a feed fluid may come into contact with a membrane, thereby forming a filtrate and a retentate. Various factors may dictate separation patterns such as membrane pore size and separation driving force. Membrane integrity must be maintained so that a consistent membrane pore size and/or separation driving force may desirably filter contaminants such as parasites (e.g., Cryptosporidium) and bacteria (e.g., fecal coliform). Methods of marker based membrane direct integrity testing, and systems thereof, may analyze membrane integrity in a non-destructive manner. Membranes comprising a desirable threshold of integrity may be continued to be used, whereas membranes that do not comprise a desirable threshold of integrity may be replaces so that contaminants are reliably desirably filtered.

Systems and methods of marker based membrane direct integrity testing comprise a challenge testing, a direct integrity test, and a combination thereof. A marker based membrane direct integrity test may be performed in place of a separate challenge test and/or a direct integrity test. Performing a marker based membrane direct integrity testing may not require a system to be shut down. For example, a marker based membrane direct integrity test may be performed while a system is operating (i.e., filtering and/or purifying fluid) at full volume and/or speed capacity. A marker based membrane direct integrity test may be performed while a system is not running. A system or method of marker based membrane direct integrity testing may be performed on membranes of any kind, including ceramic membranes.

Methods of Marker Based Membrane Direct Integrity Testing

According to some embodiments, methods of marker based membrane direct integrity testing comprises marker based direct integrity testing of at least one membrane. A method may comprise dosing a feed fluid of a loop with at least one marker, circulating the feed fluid through the membrane module at least once to produce a filtrate comprising a filtered at least one marker; measuring a filtrate particle concentration of the filtered at least one filtered marker in the filtrate to produce a filtrate concentration measurement; measuring a feed particle concentration of the at least one marker in the feed fluid to produce a feed concentration measurement; and calculating a log removal value from the filtrate concentration measurement and the feed concentration measurement.

Dosing a feed fluid of a loop with at least one marker may comprise dosing the feed fluid to achieve an log particle count of the at least one marker of about 2.5, or of about 3, or of about 3.5, or of about 4, or of about 4.5, or of about 5, or of about 5.5, or of about 6, or of about 6.5, or of about 7, or of about 7.5, or of about 8, or of about 8.5, or of about 9. A log particle count may be measured and calculated by a particle counter that may sample a feed fluid to measure and calculate a log particle count.

According to some embodiments, a loop may comprise a feed fluid; a pump comprising an outlet stream; a membrane module comprising at least one membrane and a membrane module outlet. A loop may also comprise a marker recycle stream in fluid communication with a membrane module outlet stream and a pump. A loop may also comprise a means to measure particle concentrations. A loop may be a closed loop and/or an open loop.

Circulating a feed fluid through a membrane module at least once may comprise circulating the feed fluid through a loop at least once. Circulating may comprise a continuous and/or singular circulation. Singular circulation may comprise a temporal and/or volumetric circulation.

Methods of marker based membrane direct integrity testing may be performed on a water purification system. In some embodiments, a water purification may be stopped (i.e., discontinued active fluid purification) to perform a marker based membrane direct integrity test. A water purification may continue to be active (i.e., continued active fluid purification) to perform a marker based membrane direct integrity test. A method of marker based membrane direct integrity testing may be performed wherein at least one membrane module is configured to operate at a flux from about 100 liters/m$^2$/h to about 2,000 liters/m$^2$/h during the method of marker based direct integrity testing of a membrane. A method of marker based membrane direct integrity testing may be performed, wherein at least one membrane module is configured to operate at a flux of about 100 liters/m$^2$/h, or of about 200 liters/m$^2$/h, or of about 400 liters/m$^2$/h, or of about 600 liters/m$^2$/h, or of about 800 liters/m$^2$/h, or of about 1,000 liters/m$^2$/h, or of about 1,200 liters/m$^2$/h, or of about 1,400 liters/m$^2$/h, or of about 1,600 liters/m$^2$/h, or of about 1,800 liters/m$^2$/h, or of about 2,000 liters/m$^2$/h. A method of marker based membrane direct integrity testing may be performed, wherein at least one membrane module is configured to operate at a flux of about 2000 liters/m$^2$/h or less during the method of marker based direct integrity testing of a membrane.

Methods of marker based membrane direct integrity testing may be performed on at least one membrane. Methods of marker based membrane direct integrity testing may be performed on more than one membrane in at least one series. Methods of marker based membrane direct integrity testing may be performed on at more than one membrane in parallel. Methods of marker based membrane direct integrity testing may be performed on more than one membrane in series and/or parallel, or a combination thereof.

Methods of marker based membrane direct integrity testing may comprise isolating a loop from at least one portion of a water purification system. Isolating a loop may comprise any type of valve (e.g., shut-off valve), seal, hatch, and/or physical separation. A valve may comprise a stop valve, a straight valve, a gate valve, a ball valve, a butterfly valve, a disc valve, a choke valve, a check valve, a globe valve, a pinch valve, a thermal expansion valve, a sampling valve, a piston valve, a diaphragm valve, and combinations thereof. Isolating a loop from at least one portion of a water purification system may be permanent and/or temporary.

Removal Efficiency and Membrane Integrity

In some embodiments, a method of marker based membrane direct integrity testing system may comprise a removal efficiency. A removal efficiency may be inversely proportional to membrane integrity. A membrane with a desirable removal efficiency may have less membrane integrity than a membrane with a less than desirable removal efficiency. A removal efficiency may be expressed as a log removal value (LRV). An LRV may be calculated as $LRV=\log(C_f)-\log(C_p)$, wherein Cf may be a feed concentration of at least one challenge particle and $C_p$ may be a filtrate concentration of the at least one challenge particle. Cf may be a dose concentration of at least one challenge particle. A dose concentration may be calculated using a formula developed through testing various concentrations at various volumes (e.g., calibration curve). If a challenge particle is not detected in a filtrate, a term $C_p$ may be set equal to a detection limit for calculating a LRV. An LRV may be calculated for each membrane module evaluated during the challenge test. A membrane module may contain at least one membrane. It will be appreciated by those of ordinary skill in the art having the benefit of the instant disclosure that a membrane may be said to have a breach when it comprises an undesirable opening (e.g., tear, pore, or other aperture) that traverses the working matrix of the membrane and is larger (e.g., substantially larger) than the maximum openings otherwise present in the membrane. A breach may compromise a membrane's ability to restrict movement of particles above a desired threshold size.

In some embodiments, presence of a breach may be determined by measuring a filtrate particle concentration of a filtered particle (e.g., marker). A breach may be determined by assessing whether a challenge particle is present at or above a threshold value of a particle concentration in a volume of a fluid, an LRV, or a combination thereof. A breach may be determined empirically from a presence or an absence of a filtered particle measured from a volume of a fluid. A breach may also be set based on calculated values. A presence of a threshold value of particles of various sizes and shapes may indicate a presence of a breach of various sizes. For example, presence of a threshold value of a first particle or a first contaminant may indicate a breach of about 3 µm, wherein presence of a threshold value of a second particle or a second contaminant may indicate a breach of about 4 µm. In some embodiments, presence of a challenge particle at or above a first concentration may indicate a 3 µm breach and presence of the challenge particle at or above a second concentration may indicate a 4 µm breach. A challenge particle may comprise a contaminant or may be a proxy for a contaminant. As indicated, a breach may be a factor determined by particle or contaminant size, but may also depend on filter characteristics comprising composition, porosity, packing, dimensions, and mesh. A breach determination by measuring a filtered particle concentration of a fluid may also be affected by which measuring instrument is used, such as whether a particle counter, turbidity measurement device, or combination thereof is used. For example, a particle counter or a turbidity measurement device may be tuned for various sensitivity and detection ranges, which may provide for variations in breach detection through a measurement of a filtered particle concentration from a volume of filtered fluid.

Marker Based Membrane Direct Integrity Testing System

According to some embodiments, a marker based direct integrity membrane testing system may be configured to measure a log removal value. A marker based direct integrity membrane testing system may comprising a feed fluid comprising at least one marker, the at least one marker comprising at least one challenge particle. A marker based direct integrity membrane testing system may comprise a loop comprising a pump comprising an outlet stream; a membrane module comprising at least one membrane and membrane module outlet stream, wherein the membrane module is in fluid communication with the outlet stream; a marker recycle stream in fluid communication with the membrane module outlet stream and the pump; and a particle counter. A membrane module may comprise at least one membrane. At least one membrane may be a ceramic membrane.

A marker based direct integrity membrane testing system may comprise a high solids contact reactor tank in fluid communication in fluid communication with a pump; an inlet configured to receive an influent fluid, wherein the inlet is in fluid communication with the high solids contact reactor tank. A marker based direct integrity membrane testing system may comprise an influent turbidity measurement device; an exit stream in fluid communication with a membrane module; and a permeate turbidity measurement device in fluid communication with the exit stream.

Challenge Particle

In some embodiments, a marker based membrane direct integrity testing system may comprise at least one challenge particle (i.e., marker). According to some embodiments, at least one challenge particle may serve as a surrogate for a parasite (e.g., *Cryptosporidium* and *Giardia*) and a coliform bacteria (e.g., *fecal coliform*). At least one challenge particle may have a generally spherical shape (e.g., similar to *Cryptosporidium*). At least one challenge particle may have a comparable particle size that is similar to *Cryptosporidium*. At least one challenge particle may also have a neutral particle surface charge, which may be similar to Cryptosporidium. At least one challenge particle may be configured to be a surrogate for fecal coliform, wherein fecal coliform has a size range from about 1 µm to about 4 µm. At least one challenge particle may be configured to be a surrogate for *Cryptosporidium*, wherein *Cryptosporidium* has a size range from about 3 µm to about 7 µm. At least one challenge particle may be configured to be a surrogate for *Giardia*, wherein *Giardia* has a size range from about 7 µm to about 15 µm. At least one challenge particle may be a marker. At least one marker may be made in a pre-mixed solution and stored in a separate tank. Dosing a feed fluid of a loop with at least one marker may be done by a positive displacement pump. A positive displacement pump may be configured to dose a specific volume and/or mass of at least one marker.

At least one challenge particle may have a particle size from about 0.5 µm to about 7 µm. At least one challenge particle may have a particle size of less than about 7 µm, or less than about 6 µm, or less than about 5.5 µm, or less than about 5 µm, or less than about 4.5 µm, or less than about 4 µm, or less than about 3.5 µm, or less than about 3 µm, or less than about 2.5 µm, or less than about 2 µm, or less than about 1.5 µm, or less than about 1 µm, or less than about 0.5 µm. At least one challenge particle may have a particle size of about 7 µm, or of about 6 µm, or of about 5.5 µm, or of about 5 µm, or of about 4.5 µm, or of about 4 µm, or of about 3.5 µm, or of about 3 µm, or of about 2.5 µm, or of about 2 µm, or of about 1.5 µm, or of about 1 µm, or of about 0.5 µm. At least one challenge particle may have a particle size from about 0.5 µm to about 7 µm, or from about 1 µm to about 6 µm, or from about 2 µm to about 4 µm, or from about 2.5 µm to about 3.5 µm, or from about 0.5 µm to about 7 µm, or from about 0.5 µm to about 6 µm, or from about 0.5 µm to about 5 µm, or from about 0.5 µm to about 4 µm, or from about 0.5 µm to about 3 µm, or from about 0.5 µm to about 2 µm, or from about 0.5 µm to about 1 µm.

In some embodiments, at least one challenge particle may have a neutral surface charge. At least one challenge particle may have a neutral surface charge at a neutral pH (i.e., pH=about 7). At least one challenge particle may have a neutral surface charge at a pH of about 3.5, or of about 4, or of about 4.5, or of about 5, or of about 5.5, or of about 6, or of about 6.5, or of about 7, or of about 7.5, or of about 8, or of about 8.5, or of about 9. At least one challenge particle may have a neutral surface charge at a pH from about 3.9 to about 8.2.

According to some embodiments, at least one challenge particle may be selected from the group consisting of $TiO_2$, $ZrO_2$, $SiO_2$, $MnO_2$, SiC, CuO, MgO, and $Al_2O_3$. At least one challenge particle may be $TiO_2$. At least one challenge particle may be nanoparticle type P25 $TiO_2$. A nanoparticle type P25 $TiO_2$ may have about 27 to about 36% by mass of particles having a particle size of between about 2 µm and about 3 µm. A nanoparticle type P25 $TiO_2$ may have about 25 to about 40% by mass of particles having a particle size of between about 2 µm and about 3 µm. A nanoparticle type P25 $TiO_2$ may have about 35.8% by mass of particles having a particle size of between about 2 µm and about 3 µm. At least one production membrane may be subjected to a marker based membrane direct integrity test prior to delivery of the at least one membrane and an integrity of at least one membrane may be verified daily during operations. An at least one challenge particle (e.g., marker) cost structure may comprise about $0.40/ day/millions of gallons per day) for a marker based membrane direct integrity test. A single charge of $TiO_2$ may be used on a process that more than one membrane and/or membrane modules in a series. A single charge of $TiO_2$ may be used on a process that including two membranes and/or membrane modules in a series.

Particle Counter

In some embodiments, a marker based membrane direct integrity testing system may comprise a particle counter. A particle counter may indirectly or directly measure the size and count of particles in a volume of a fluid. For example, a particle counter may indirectly or directly measure the concentration of particles of a fluid. A particle counter may provide for a means to measure a particle (e.g., challenge particle) concentration. In some embodiments, a particle counter may measure a concentration of a challenge particle contained in a fluid. A particle counter may also be configured to measure for a removal of fluid contaminants (e.g., *Giardia* and *Cryptosporidium*). A particle counter may sample fluid from a system while the system is running (e.g., actively filtering fluid). A particle counter may be used to perform a marker based membrane direct integrity test for more than one membrane and/or membrane module. In some embodiments, a false negative may be observed by a particle counter if air bubbles in a permeate fluid are measured as particles. A particle counter may sample a feed fluid and/or a filtrate fluid to measure and calculate a log particle count. A particle counter may sample a feed fluid and/or a filtrate fluid while a water purification system is operating and/or when the water purification system is not operating.

Turbidity Measurement Device

A marker based membrane direct integrity testing system may comprise a turbidity measurement device (i.e., turbidity meter). A turbidity measurement device may measure the cloudiness or haziness of a fluid that may be caused by individual particles (i.e., turbidity). Turbidity may be measured in nephelometric turbidity units (NTU). A turbidity measurement device may be configured to measure the turbidity of an influent fluid as well as a permeate fluid. In some embodiments, a turbidity measurement device may directly or indirectly measure a number of particles in a volume of a fluid. A turbidity measurement device may provide for a means to measure a particle concentration of a fluid. A turbidity measurement device may be used to measure the concentration of at least one marker. A direct correlation between turbidity and a concentration of at least one marker may be established.

Membrane Module

The present disclosure relates, in some embodiments, to a membrane module comprising at least one membrane, an interior membrane module cavity, and a membrane module outlet in fluid communication with the interior membrane module cavity. A membrane module may receive fluid from a pump through a pump outlet stream. A membrane module may have a marker recycle stream. A membrane module may have any desired shape. In some embodiments, a membrane module may have a generally cylindrical shape defining a central longitudinal axis and a cavity spanning its length. For example, up to all sections perpendicular to a central membrane module axis may have a generally annular shape. A membrane module may have a hollow, generally cylindrical shape, a first end and a second end according to some embodiments. Each end may define an aperture sized and/or shaped to receive a ceramic element interface.

A membrane module may have any desired dimensions. According to some embodiments, a membrane module may be from about 10 cm to about 5 m long, from about 50 cm to about 5 m long, from about 1 m to about 3 m long, and/or combinations thereof. A section taken perpendicular to the longitudinal axis may have a longest dimension (e.g., diagonal or diameter) from about 2 cm to about 30 cm in diameter, from about 2 cm to about 20 cm in diameter, from about 5 cm to about 20 cm in diameter, from about 5 cm to about 15 cm in diameter, from about 10 cm to about 45 cm in diameter, and/or combinations thereof. A membrane module may be configured for cross-flow filtration (i.e., tangential filtration) and/or dead-end filtration. A membrane module may be configured to permit outside-in filtration and/or inside-out filtration.

Ceramic Membrane

A ceramic element (also called an element) may comprise, according to some embodiments, a filter of any desired size, shape, or composition. For example, a ceramic element may comprise a generally tubular filter (e.g., a ceramic filter). A ceramic element may include any desired filter or filter material. For example, a ceramic element may comprise a filter having one or more organic polymers and/or one or more ceramic materials. Examples of filters (e.g., ceramic membranes) may include microfiltration filters, ultrafiltration filters, nanofiltration filters, antimicrobial filters, maintenance-free filters, and combinations thereof. A filter may comprise an antimicrobial agent. For example, a ceramic filter may comprise silver (e.g., an impregnated, non-leachable silver). In some embodiments, a ceramic element may exclude a filter (e.g., where the element adsorbs ions). A ceramic membrane may be filter through cross-flow filtration (i.e., tangential filtration) and/or dead-end filtration. A ceramic membrane may be configured for outside-in filtration and/or inside-out filtration.

In some embodiments, ceramic filters may be durable (e.g., more durable than organic polymer filters). For example, ceramic filters may be resistant to mechanical damage, solvents, and/or microbes. Example metrics of performance and/or resistance may be the degree of filtration provided for one or more contaminants, conductivity, usable lifespan, and/or combinations thereof. Desired performance and/or resistance may be expressed as a fraction (e.g., percentage) compared in the presence or absence of challenge, relative to another membrane, or against a threshold or target value.

In some embodiments, a ceramic membrane may comprise a ceramic element and a filter layer. For example, a ceramic membrane may comprise a filtration layer (e.g., a membrane) having smaller pores and an underlying base or substrate having larger pores. A ceramic membrane may include a filter layer only inside the channels and an epoxy coating sealing the end face. According to some embodiments, a filtration layer may instead cover an interior surface, an end face, and/or an exterior surface. For example, a filtration layer may define, be coextensive with, and/or cover a contaminated media facing surface of an element. A ceramic filtration layer may line the interior surface (e.g., channels), wrap around the face of the element, and extend a portion of the way down the outside of the element (at each end). A base may define, be coextensive with, and/or cover a permeate facing surface.

An elongate ceramic element may have a cross-section (e.g., a section perpendicular to the central longitudinal axis) with any desired regular or irregular geometric shape. For example, an element cross-section may have a shape selected from generally circular, generally elliptical, generally polygonal (e.g., hexagonal), and/or combinations thereof. An elongate element may have a central axis with one or more channels along the length of the element and generally parallel to the axis.

A ceramic element may have any desired dimensions. According to some embodiments, an elongate element may be from about 10 cm to about 5 m long, from about 50 cm to about 5 m long, from about 1 m to about 3 m long, and/or combinations thereof. A section taken perpendicular to the longitudinal axis (e.g., "diameter") may be from about 2 cm to about 30 cm in diameter, from about 2 cm to about 20 cm in diameter, from about 5 cm to about 20 cm in diameter, from about 5 cm to about 15 cm in diameter, from about 10 cm to about 45 cm in diameter, and/or combinations thereof. An element may comprise one or more longitudinal channels. For example, an element may have about 37 channels arranged in 7 rows with 4-7 channels in each row. An element may have about 19 channels arranged in 5 rows with 3-5 channels in each row. Each channel may independently have any desired shape and/or dimension. In some embodiments, a channel may have a generally circular shape with a radius from about 1 mm to about 15 cm, from about 2 mm to about 10 cm, from about 5 mm to about 5 cm, from about 1 cm to about 5 cm, and/or combinations thereof.

A ceramic element (e.g., a substrate) may comprise up to about 100% (w/w) silicon carbide. Silicon carbide (SiC) is a semi-conductor material, meaning that it has electrical conductivity that ranks between that of an insulator and a metal. A semiconductor may change its electrical conductance with the addition of a dopant. For SiC, dopants which increase electrical conductivity may include, for example, boron, aluminum and nitrogen.

A ceramic element may be configured, in some embodiments, to selectively filter a fluid with respect to the sizes of the solids (e.g., dissolved solids, suspended solids) present. For example, a ceramic element may include a membrane having pores sized to separate, exclude, and/or remove contaminants (e.g., particles) on the basis of their size. According to some embodiments, a ceramic element may be configured to separate, exclude, and/or remove contaminants with respect to their charge. For example, a ceramic element may be configured to reduce the number of charged contaminants in a fluid (e.g., a contaminated media, a permeate produced in a prior purification step). A ceramic element may comprise one more polar and/or charged components. A ceramic element may comprise, in some embodiments, one or more components that may become charged upon application of a current. Charged contaminants may be separated, excluded, and/or removed by adsorption to an oppositely charged substrate material as fluid continues through the element according to some embodiments.

In some embodiments, a marker based membrane direct integrity testing system may comprise an inside out style membrane. A marker based membrane direct integrity testing system may also comprise membrane plates.

High Solids Contact Reactor Tank

In some embodiments, a marker based membrane direct integrity testing system may comprise a high solids contact reactor tank. A high solids contact reactor tank may comprise, in some embodiments, an inlet and a ceramic element interface, according to some embodiments. A high solids contact reactor tank may comprise an interior cavity. An interior cavity may have any desired size and/or any desired shape. For example, a cavity may have a rounded and/or generally dome shape. A high solids contact reactor tank may have an outer perimeter and/or circumference. In some embodiments an outer perimeter and/or circumference may be configured as and/or define a high solids contact reactor tank flange. A high solids contact reactor tank flange may be configured to engage a permeate chamber (e.g., a permeate chamber comprising a similar or mated flange). In some embodiments, a high solids contact reactor tank flange may comprise a channel for a gasket, O-ring, or other seal. A high solids contact reactor tank channel may be positioned on one face of a flange and/or substantially parallel to an outer perimeter and/or circumference in some embodiments According to some embodiments, a high solids contact reactor tank may have one or more inlets and/or one or more outlets. For example, a high solids contact reactor tank may have a ceramic element interface comprising one or more outlets. Each outlet may be configured to engage a ceramic element, for example, with a substantially fluid-tight seal. In some embodiments, an outlet may have any desired shape (e.g., cylindrical, conical, frustoconical). All high solids contact reactor tank outlets may be positioned in an interface and/or inside a high solids contact reactor tank channel.

A high solids contact reactor tank and/or a concentrate chamber may have any desired dimensions. According to some embodiments, a high solids contact reactor tank may have a length from about 100 cm to about 1,000 cm. A section taken perpendicular to a chamber's longitudinal axis may have a longest dimension (e.g., diagonal or diameter) from about 100 cm to about 600 cm in diameter.

Pump

According to some embodiments, a marker based membrane direct integrity testing system may comprise a pump. A pump may be disposed between a concentrate tank and a filtration unit. A pump may be in fluid communication with an exit stream of a concentrate tank. A pump may be configured to regulate flow rate of a concentrated fluid from the concentrate tank to a filtration unit to create a desired cross flow through the filtration unit, and provide sufficient mixing in the concentrate tank.

Various types of pump may be used without departing from the description herein. In some embodiments, a pump may be a turbomolecular, centrifugal pump, vacuum pump, horizontal pump, or screw pump.

Inlet

In some embodiments, a marker based membrane direct integrity testing system may comprise an inlet. In some embodiments, an inlet may comprise a pipe, tube, or stream. An inlet, pipe or tube may comprise particular materials and may have a particular length or diameter. An inlet may be configured to receive an influent fluid. An influent fluid may have a particular flow rate or a flow rate of a contaminated fluid therein. Dimensions and specifications such as particular materials, length and diameter of pipes, and flow rates may be varied without departing from the description herein.

SPECIFIC EXAMPLE EMBODIMENTS

Figure 1:
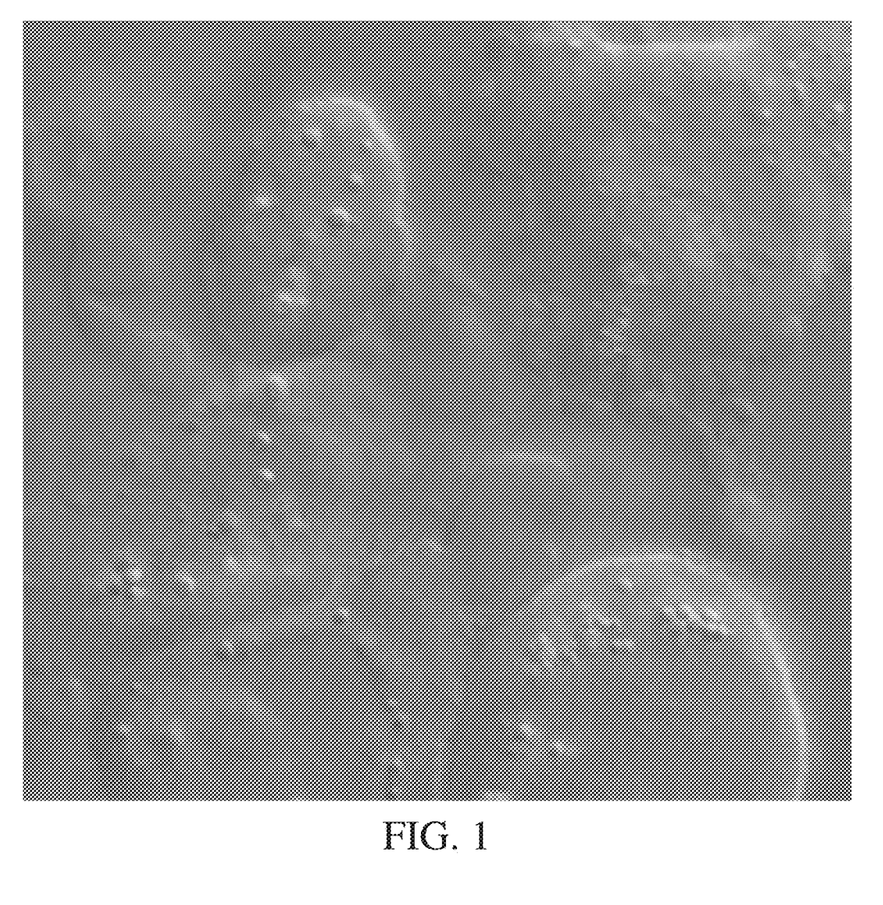
FIG. 1 illustrates an electron micrograph of *Cryptosporidium* according to a specific example embodiment of the disclosure.

FIG. 1 illustrates an electron micrograph of *Cryptosporidium* according to a specific example embodiment of the disclosure. FIG. 1 illustrates a spherical (e.g., sphere, spheroid) shape and a relative size of *Cryptosporidium*, wherein the *Cryptosporidium* oocysts may have a diameter from about 4 µm to about 6 µm. A challenge particle may serve as a surrogate for *Cryptosporidium* and may have a spherical structure and size that is similar to *Cryptosporidium*. A challenge particle may have a particle size or a diameter from about 1 µm to about 2 µm, which may be a smaller diameter than *Cryptosporidium*.

Figure 2:
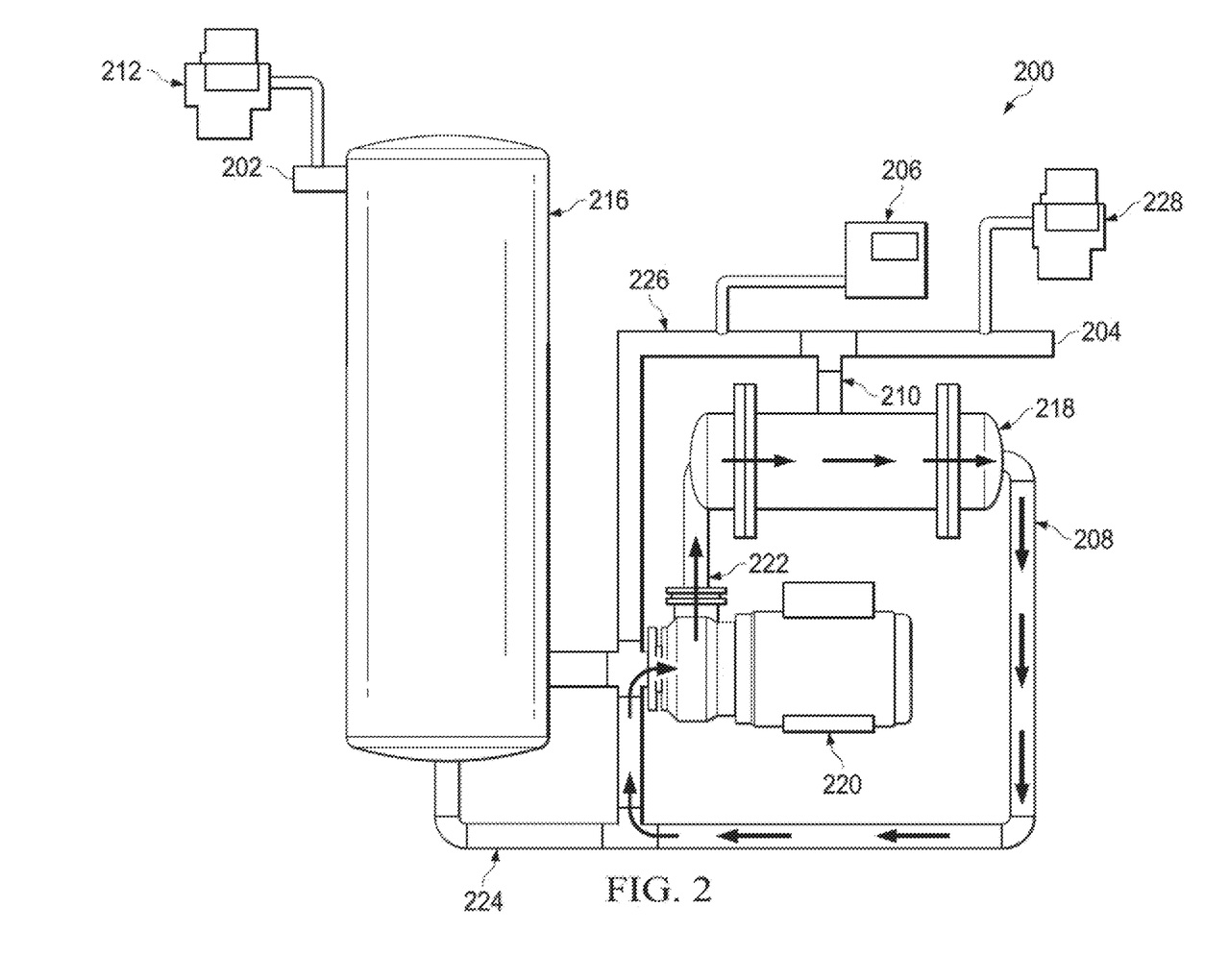
FIG. 2 illustrates a marker based membrane direct integrity testing system according to a specific example embodiment of the disclosure.

A specific example embodiment of a marker based membrane direct integrity testing system is illustrated in FIG. 2. FIG. 2 illustrates a marker based membrane direct integrity testing system 200 according to a specific example embodiment of the disclosure. A system 200 for marker based direct integrity testing of membranes may comprise an inlet 202, a high solids contact reactor tank 216, a high solids contact reactor tank recycle stream 224, an influent turbidity measurement device 212, a permeate turbidity measurement device 228, a pump 220 (e.g., turbo molecular pump), a membrane module 218, a marker recycle stream 208, a particle counter 206, a pump outlet stream 222, a recycle stream 226, a membrane module outlet stream 210, and an exit stream 204. System 200 may be configured for contaminant removal. System 200 may be configured for a marker based method of DIT. A positive pressure pump may be configured to dose a system 200 with at least one marker.

An inlet 202 may be in fluid communication with a high solids contact reactor tank 216 and an influent turbidity measurement device 212. A high solids contact reactor tank 216 may receive fluid from an inlet 202. A high solids contact reactor tank 216 may comprise an about 200 gallon tank and may comprise an about 6 ft (i.e., 1.8288 m) diameter.

A high solids contact reactor tank 216 may be in fluid communication with a pump 220, wherein the pump 220 may be configured to drive, discharge, and/or regulate flow of a fluid to a pump outlet stream 204 that is in fluid communication with a membrane module 218. A membrane module 218 may comprise a marker recycle stream that is in fluid communication with a pump 220 and a high solids contact reactor tank recycle stream 224. A membrane module may comprise at least one ceramic membrane. A membrane module may also comprise a membrane module outlet stream 210 that is in fluid communication with an outlet 204 and a recycle stream 226. A particle counter 206 may be in fluid communication with a recycle stream 226, wherein the particle counter 206 may sample fluid from the recycle stream 226. A particle counter 206 may be in fluid communication with a membrane module outlet stream 210. A permeate turbidity measurement device 228 may be in fluid communication with an outlet 204, wherein the permeate turbidity measurement device 228 may sample fluid from the outlet 204. A pump 220 may receive fluid from a recycle stream and/or a marker recycle stream 208. A marker recycle stream 208 may receive fluid from a high solids contact reactor tank recycle stream 216.

Figure 3:
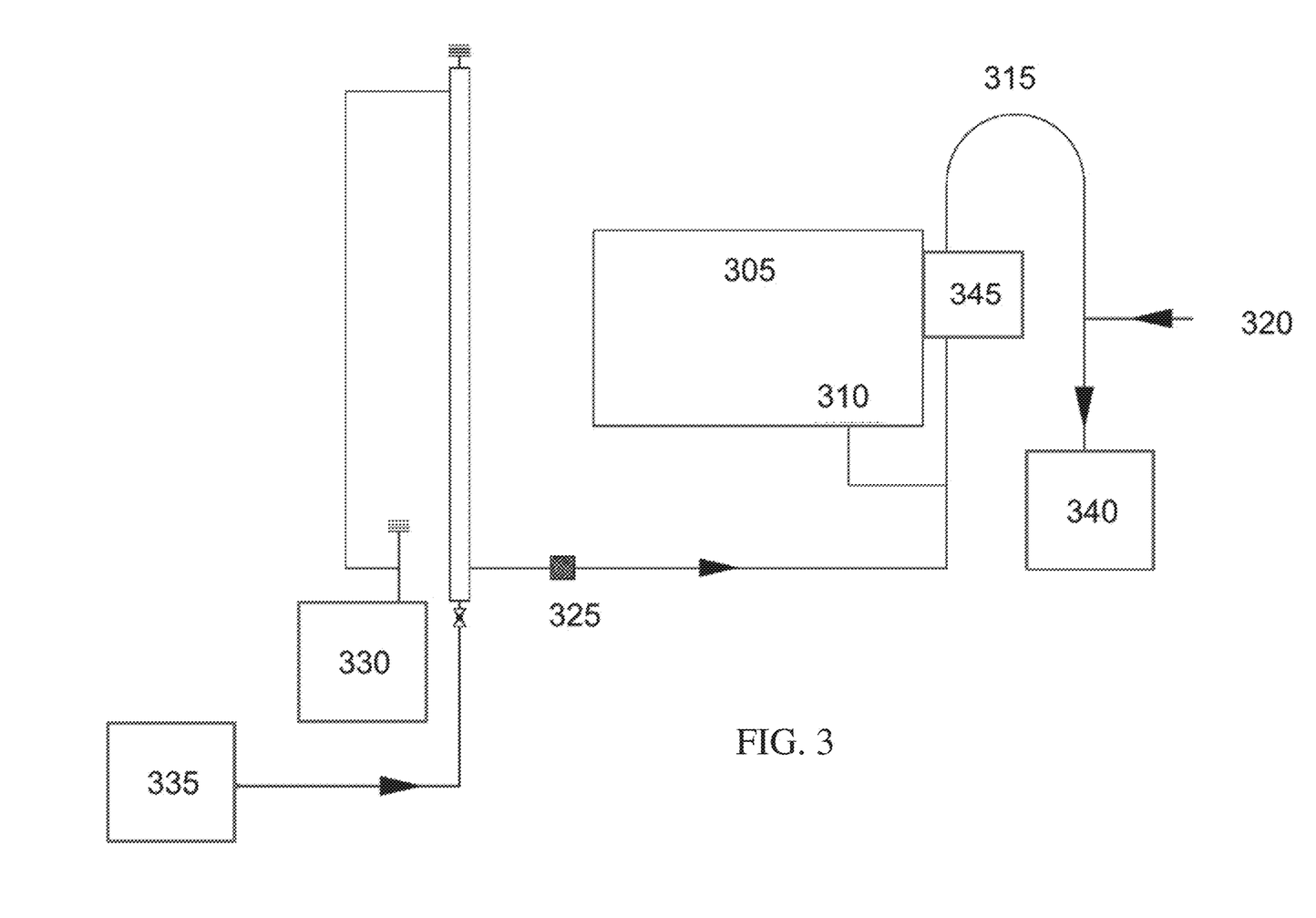
FIG. 3 illustrates a particle counter system according to a specific example embodiment of the disclosure.

A specific example embodiment of a marker based membrane direct integrity testing system is illustrated in FIG. 3. FIG. 3 illustrates a particle counter 305 set-up according to a specific example embodiment of the disclosure. A particle counter 305 may comprise an inlet 335, a first drain 330, a mesh screen 325 (e.g., 80 mesh screen), a flow transducer 310, a particle sensor 345, a shepherds crook 315, an air vent vacuum breaker 320, and a second drain 340. A particle counter 305 may comprise a first inlet 335 in fluid communication with a first drain 330, and a mesh 325. A mesh 325 may be in fluid communication with a flow transducer 310, and a particle sensor 345. A particle sensor 345 may be in fluid communication with a shepherd's crook 315. A shepherd's crook 315 may be in fluid communication with an air vent vacuum break 320 and a second drain 340.

As will be understood by those skilled in the art who have the benefit of the instant disclosure, other equivalent or alternative compositions, devices, methods, and systems for marker based direct integrity testing of a membrane can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of inlets, apertures, filters, gaskets, valves, pumps, sensors, and/or outlets may be varied. In some embodiments, filters, seal gaskets, and/or filtration assemblies may be interchangeable. Interchangeability may allow the size and/or kind of contaminates to be custom adjusted (e.g., by varying or selecting the pore size and/or kind of filter used). In addition, the size of a device and/or system may be scaled up (e.g., to be used for high throughput commercial or municipal fluid filtration applications) or down (e.g., to be used for lower throughput household or research applications) to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. For example, a composition, device, and/or system may be prepared and or used as appropriate for animals and/or humans (e.g., with regard to sanitary, infectivity, safety, toxicity, biometric, and other considerations). Elements, compositions, devices, systems, methods, and method steps not recited may be included or excluded as desired or required.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/−about 10%, depicted value+/−about 50%, depicted value+/−about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a device and/or system for marker based direct integrity testing of a membrane may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1

Marker Based Direct Integrity Testing System

A marker based direct integrity testing system may be configured as shown in Table 1. A marker based direct integrity testing system may be set up for testing and laboratory work. A marker based direct integrity testing system may be designed and constructed as a full scale unit.

TABLE 1

Marker Based Direct Integrity Testing System Specification

| Parameter | Value |
| --- | --- |
| Dimensions | |
| Ceramic Element Length | 1020 mm |
| Ceramic Element Surface Area | 0.569 m$^2$ |
| Filtration Flow Direction | Inside Out |
| Operating Limits | |
| Maximum certified flux at 20° C. | 2000 LMH |
| Maximum certified flow at 20° C. | 19 L/min |
| Operating temperature range | No Limits |
| Maximum feed pressure | 350 psi |
| Maximum transmembrane pressure | 50 psi |
| Operating pH range | 0-14 |
| Maximum chlorine tolerance | No limits |
| Manufacturing NDPT | |
| Method | Marker Style MIT |
| Quality Control Release Value | >4 Log Removal Value |

Example 2

Marker Size and Distribution

A feed to a particle counter may be connected downstream of a loop pump and upstream of a membrane module on the concentrate side of the membrane. A baseline or initial count was obtained (before TiO$_2$ was added). The initial count consists of residual TiO$_2$ from previous tests.

After a baseline count of about 130,000 counts per 100 mL was obtained on the concentrate side of the membrane (no TiO$_2$ addition) TiO$_2$ was added batch wise (Table 2) to the feed tank and allowed to mix as per the test methodology. As shown in the table above, 2.1 ppm of TiO$_2$ created a total particle count of 5.71 log particles at 2 to <3 um. Also, the percentage of particles between 2 and 3 micron ranged from 35.8%-27.3%.

TABLE 2

Particle Count/100 mL vs TiO$_2$ concentration

| Particle Size (μm) | TiO$_2$ Concentration | | | | |
| --- | --- | --- | --- | --- | --- |
| | 0 | 0.25 ppm | 1 ppm | 1.5 ppm | 2.1 ppm |
| 2+ | 130000 | 318000 | 1045000 | 1438000 | 1860000 |
| 3+ | 80800 | 204000 | 712000 | 1023900 | 1353000 |
| 5+ | 23700 | 50900 | 206500 | 321000 | 445200 |
| 7+ | 11800 | 20000 | 90900 | 145000 | 200000 |
| 10+ | 3600 | 3900 | 19800 | 30900 | 44000 |
| 15+ | 1000 | 900 | 4300 | 6000 | 7800 |
| 20+ | 300 | 200 | 600 | 500 | 800 |
| 25+ | 0 | 0 | 100 | 200 | 100 |
| Total | 130000 | 318000 | 1045000 | 1438000 | 1860000 |

TABLE 2-continued

Particle Count/100 mL vs TiO$_2$ concentration

| Particle Size (μm) | TiO$_2$ Concentration | | | | |
|---|---|---|---|---|---|
| | 0 | 0.25 ppm | 1 ppm | 1.5 ppm | 2.1 ppm |
| Total 2 to <3 | 49200 | 114000 | 333000 | 414100 | 507000 |
| log 2 to <3 | 4.69 | 5.06 | 5.52 | 5.62 | 5.71 |
| %2 to <3 | 37.8% | 35.8% | 31.9% | 28.8% | 27.3% |

The test was repeated with another batch of TiO$_2$. The test data is found in Table 3.

TABLE 3

Particle Count/100 mL vs TiO$_2$ concentration

| Particle Size (μm) | TiO$_2$ Concentration | | | |
|---|---|---|---|---|
| | 0 | 1 ppm | 1.5 ppm | 2.1 ppm |
| 2+ | 228500 | 1080000 | 1432000 | 1782000 |
| 3+ | 139900 | 721000 | 987000 | 1271000 |
| 5+ | 3400 | 189000 | 273500 | 370000 |
| 7+ | 14000 | 72800 | 105800 | 145200 |
| 10+ | 2700 | 12200 | 15000 | 21900 |
| 15+ | 400 | 2500 | 3000 | 4100 |
| 20+ | 100 | 500 | 600 | 800 |
| 25+ | 100 | 100 | 200 | 200 |
| Total | 228500 | 1080000 | 1432000 | 1782000 |
| Total 2 to <3 | 88600 | 359000 | 445000 | 511000 |
| log 2 to <3 | 4.95 | 5.56 | 5.65 | 5.71 |
| %2 to <3 | 38.8% | 33.2% | 31.1% | 28.7% |

With increased TiO$_2$ loading the percentage of particles in the 2-3 micron range declined above 1.25 ppm concentration. The particle counter manufacturer advised that at concentrations above 1,000,000 counts/100 mL some shadowing of particles occurs providing counts lower than what is actually present. (i.e., Upper Range of the Sensor).

To mitigate this error for the calculation of how much TiO$_2$ is required to achieve 6.5 Log particles/100 ml, the results from the smallest addition of TiO$_2$ not exceeding 1.25 ppm are used (prior to the bend in the curve).

A desired concentration of TiO$_2$ may be calculated as follows:

A trend line equation for an average amount of TiO$_2$ particles for a given concentration is:

$$Y \text{ (particles 2-3 micron)} = 276{,}558 \times X \text{ (Desired TiO}_2 \text{ Concentration)}$$

The number of particles required for 6.5 Log challenge is: 6.5 Log particles=3,162,278 particles. Therefore the required marker concentration is: 3,162,278 particles/276,558=11.43 ppm (Desired TiO$_2$ Concentration). To achieve a 6.5 Log particles/100 ml we must add 11.43 ppm of TiO$_2$ powder to the concentrate side of the membrane. To be conservative the value will be rounded up to 12 ppm. Therefore 12 grams of TiO$_2$ may be required per 1000 liters of water.

Example 3

Marker Concentration

The following formula may be used to calculate an amount of TiO$_2$ needed in a given system for performing a marker based direct integrity testing:

$$((12 \text{ grams TiO}_2)/(1000 \text{ Liters})) \times \text{water volume of loop (Liters)}$$

Table 4 demonstrates amounts of TiO$_2$ needed to be added to various water volume amounts to achieve a 6.5 Log particles/100 mL.

TABLE 4

Amounts of TiO$_2$ Added Per Loop Volume

| Unit Size | Water Volume of Ceramic Ultra Filtration Concentrate Loop (Liters) | Amount TiO$_2$ Required (Grams) |
|---|---|---|
| M16 | 505 | 6.06 |
| M36 | 980 | 11.76 |
| DM36 | 1870 | 22.44 |
| M48 | 2500 | 30.00 |

What is claimed is:

1. A method of marker based direct integrity testing of at least one membrane comprising:
    (a) dosing a feed fluid of a loop with at least one marker comprising at least one challenge particle to generate a dosed feed fluid, wherein the at least one challenge particle is a TiO$_2$, the loop comprising:
        a pump comprising an outlet stream;
        a membrane module comprising at least one membrane and a membrane module outlet stream, wherein the membrane module is in fluid communication with the outlet stream;
        a marker recycle stream in fluid communication with the membrane module outlet stream and the pump; and
        a particle counter;
    (b) circulating the dosed feed fluid through the at least one membrane module at least once to produce a filtrate; and
    (c) measuring a filtrate particle concentration of the at least one filtered marker in the filtrate to produce a filtrate concentration measurement.

2. The method of marker based direct integrity testing of at least one membrane of claim 1, wherein the at least one membrane comprises at least one ceramic membrane.

3. The method of marker based direct integrity testing of at least one membrane of claim 2, wherein the at least one ceramic membrane is selected from the group consisting of TiO$_2$, ZrO$_2$, SiO$_2$, MnO$_2$, SiC, CuO, MgO, and Al$_2$O$_3$.

4. The method of marker based direct integrity testing of at least one membrane of claim 1, wherein one of:
    dosing the feed fluid of a loop with the at least one marker comprising the at least one solid challenge particle comprises a concentration of the at least one marker of about 6.5 log particle count, and
    the at least one membrane module is configured to operate at a flux from about 100 liters/m$^2$/h to about 2,000 liters/m$^2$/h during the method of marker based direct integrity testing of a membrane.

5. The method of marker based direct integrity testing of at least one membrane of claim 1, wherein the $TiO_2$ is a P25 $TiO_2$.

6. The method of marker based direct integrity testing of at least one membrane of claim 1, further comprising replacing the at least one membrane if the filtrate particle concentration exceeds a threshold level.

7. The method of marker based direct integrity testing of at least one membrane of claim 1, further comprising calculating a log removal value from the filtrate particle concentration, wherein the log removal value is less than about 3.

8. A method of marker based direct integrity testing of at least one membrane comprising:
   (a) isolating a loop from at least one portion of a water purification system, the loop comprising:
   a feed fluid;
   a pump comprising an outlet stream;
   a membrane module comprising at least one membrane and a membrane module outlet stream, wherein the membrane module is in fluid communication with the outlet stream;
   a marker recycle stream in fluid communication with the membrane module outlet stream and the pump; and
   a particle counter;
   (b) dosing the feed fluid with at least one marker comprising at least one solid challenge particle to generate the dosed feed fluid, wherein the at least one solid challenge particle is a $TiO_2$;
   (c) circulating the dosed feed fluid through the at least one membrane module at least once to produce the filtrate; and
   (d) measuring a filtrate particle concentration of the at least one filtered marker in the filtrate to produce a filtrate concentration measurement.

9. The method of marker based direct integrity testing of at least one membrane of claim 8, wherein the at least one membrane comprises at least one ceramic membrane.

10. The method of marker based direct integrity testing of at least one membrane of claim 9, wherein the at least one ceramic membrane is selected from the group consisting of $TiO_2$, $ZrO_2$, $SiO_2$, $MnO_2$, SiC, CuO, MgO, and $Al_2O_3$.

11. The method of marker based direct integrity testing of at least one membrane of claim 8, wherein one of:
   the feed particle concentration of the at least one marker in the feed fluid is about 6.5 log particle count, and
   the at least one membrane module is configured to operate at a flux from about 100 liters/$m^2$/h to about 2,000 liters/$m^2$/h during the method of marker based direct integrity testing of a membrane.

12. The method of marker based direct integrity testing of at least one membrane of claim 8, wherein the at least one solid challenge particle is a $TiO_2$.

13. The method of marker based direct integrity testing of at least one membrane of claim 8, wherein the $TiO_2$ is a P25 $TiO_2$.

14. The method of marker based direct integrity testing of at least one membrane of claim 8, further comprising replacing the at least one membrane if the filtrate concentration measurement exceeds a threshold level.

15. The method of marker based direct integrity testing of at least one membrane of claim 8, further comprising calculating a log removal value from the filtrate concentration measurement, wherein the log removal value is less than about 3.

* * * * *